US008856398B2

United States Patent
Singh

(10) Patent No.: US 8,856,398 B2
(45) Date of Patent: *Oct. 7, 2014

(54) PROCESS TO GENERATE VARIOUS LENGTH PARAMETERS IN A NUMBER OF SGLS BASED UPON THE LENGTH FIELDS OF ANOTHER SGL

(71) Applicant: LSI Corporation, San Jose, CA (US)

(72) Inventor: Gurvinder P. Singh, Pune (IN)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 14/073,016

(22) Filed: Nov. 6, 2013

(65) Prior Publication Data

US 2014/0067877 A1    Mar. 6, 2014

Related U.S. Application Data

(63) Continuation of application No. 13/114,321, filed on May 24, 2011, now Pat. No. 8,635,383.

(51) Int. Cl.
*G06F 13/28*    (2006.01)
*G06F 17/30*    (2006.01)

(52) U.S. Cl.
CPC .......... *G06F 17/30289* (2013.01); *G06F 13/28* (2013.01)
USPC .................... 710/22; 710/3; 710/23

(58) Field of Classification Search
CPC ................. G06F 13/28; G06F 3/061–3/0689
USPC .......................................... 710/22
See application file for complete search history.

(56) References Cited

U.S. PATENT DOCUMENTS

| | | | |
|---|---|---|---|
| 6,665,746 B1 | 12/2003 | Liong | 710/22 |
| 6,728,722 B1 * | 4/2004 | Shaylor | 1/1 |
| 7,062,501 B1 * | 6/2006 | Young | 1/1 |
| 7,225,395 B2 * | 5/2007 | Henry | 714/799 |
| 7,664,889 B2 * | 2/2010 | Vemula et al. | 710/22 |
| 8,065,439 B1 * | 11/2011 | Johnson et al. | 709/250 |
| 8,176,252 B1 * | 5/2012 | Alexander et al. | 711/118 |
| 2003/0084212 A1 | 5/2003 | Butterfield | 710/22 |

* cited by examiner

*Primary Examiner* — Titus Wong
(74) *Attorney, Agent, or Firm* — Christopher P. Maoirana, PC

(57) ABSTRACT

A method of generating length parameters, comprising the steps of reading a data stream from a host, detecting a particular field of the data stream, and calculating a variable based on a length parameter of a first list to be transferred. The data stream may comprise a plurality of definitions. The method may also comprise the step of selecting one of the list definitions. One of the list definitions may be used to generate a length parameter used in a second list in response to (i) the particular field of the data stream and (ii) the length parameter of the first list.

20 Claims, 3 Drawing Sheets

PROCESS TO GENERATE VARIOUS LENGTH PARAMETERS IN A NUMBER OF SGLS BASED UPON THE LENGTH FIELDS OF ANOTHER SGL

This application relates to U.S. Ser. No. 13/114,321, filed May 24, 2011, which is incorporated by reference in its entirety.

FIELD OF THE INVENTION

The present invention relates to data storage generally and, more particularly, to a method and/or apparatus to generate various length parameters in a number of SGLS based upon the length fields of another SGL.

BACKGROUND OF THE INVENTION

In a conventional multicasting environment, if all the Scatter Gather Lists (SGLs) have the same definition, then the context memory can have a single field that will describe the state of all the SGLs (i.e., a single field for data length, etc.). If all of the SGLs have different definitions, space needs to be provided in the context area for all the fields pertaining to all the SGLs.

It would be desirable to implement a method and/or apparatus to generate various length parameters in a number of SGLS based upon the length fields of another SGL.

SUMMARY OF THE INVENTION

The present invention concerns a method of generating length parameters, comprising the steps of reading a data stream from a host, detecting a particular field of the data stream, and calculating a variable based on a length parameter of a first list to be transferred. The data stream may comprise a plurality of definitions. The method may also comprise the step of selecting one of the list definitions. One of the list definitions may be used to generate a length parameter used in a second list in response to (i) the particular field of the data stream and (ii) the length parameter of the first list.

The objects, features and advantages of the present invention include generating various length parameters in a number of SGLs based upon the length fields of another SGL that may (i) be implemented for Hard Disk Drive (HDD) and/or tape storage peripherals (e.g. controllers, preamplifiers, interfaces, power management, etc.), (ii) be implemented without any change in the existing system, (iii) be seamlessly integrated to other systems, (iv) be implemented without changing the controller firmware, (v) be implemented as a complete hardware based approach, and/or (vi) be easy to implement.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
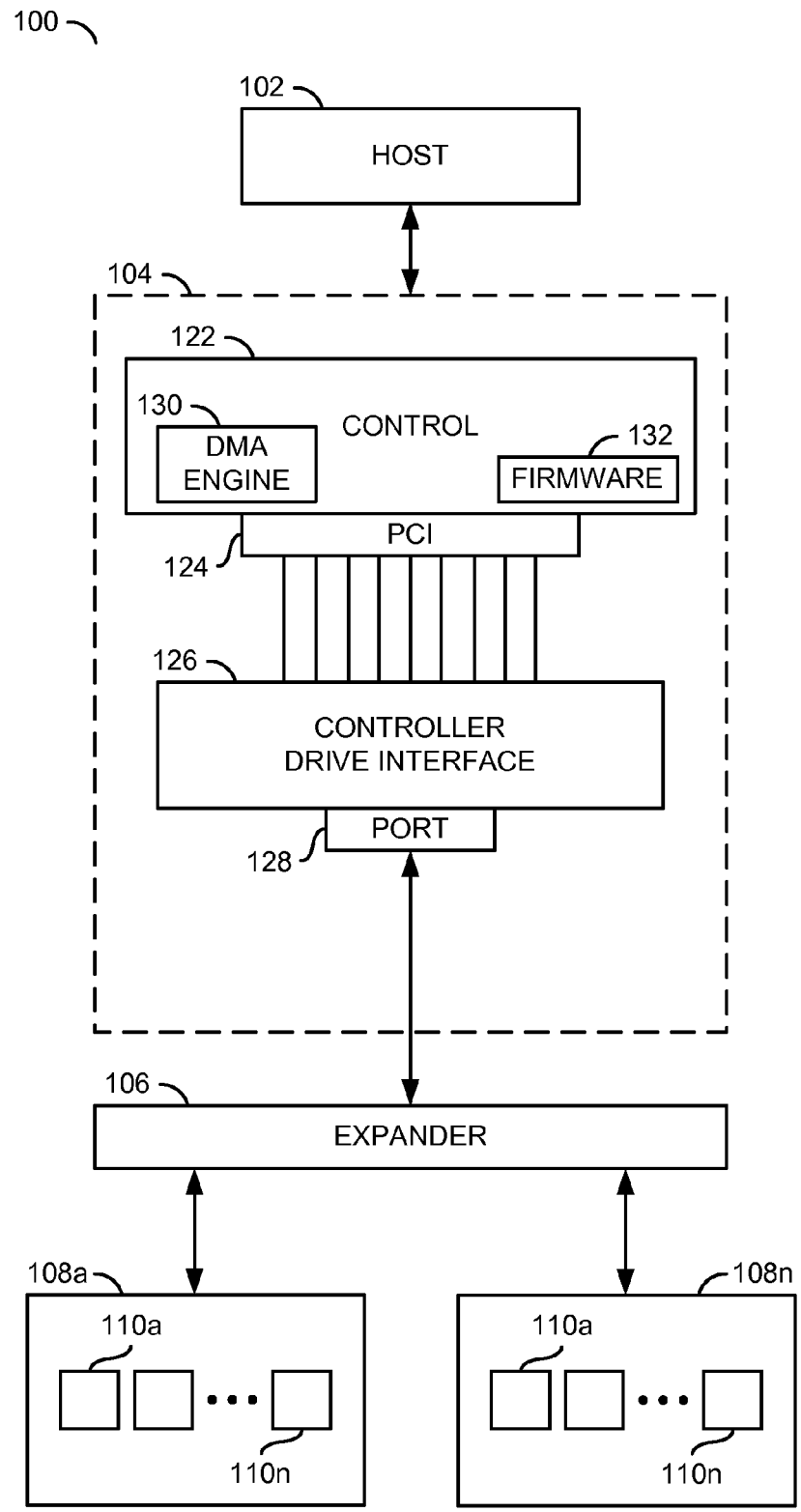
FIG. 1 is a block diagram of the present invention.

Referring to FIG. 1, a block diagram of a system 100 is shown in accordance with a preferred embodiment of the present invention. The system 100 generally comprises a block (or circuit) 102, a block (or circuit) 104, a block (or circuit) 106, and a plurality of blocks (or circuits) 108a-108n. The block 102 may be implemented as a host (or server). The block 104 may be implemented as a controller. The block 106 may be implemented as an expander (or repeater). The blocks 108a-108n may be implemented as one or more drive arrays. The blocks 108a-108n may each comprise a plurality of devices 110a-110n. In one example, the drive arrays 108a-108n may comprise a number of solid state storage devices, hard disc drives, tape drives and/or other storage devices 110a-110n. In another example, the blocks 108a-108n may be end user devices. In one example, the devices 110a-110n may be implemented as one or more Serial Attached SCSI (SAS) devices. For example, the devices 110a-110n may be implemented to operate using a SAS protocol.

The controller 104 may include a block (or circuit) 122, a block (or circuit) 124, a block (or circuit) 126 and a block (or circuit) 128. The circuit 122 may be implemented as a control circuit. In one example, the circuit 122 may be implemented as control logic for the controller 104. The circuit 122 may include a block (or circuit) 130 and a block (or module) 132. The circuit 130 may be implemented as a Direct Memory Access (DMA) engine. The module 132 may be implemented as firmware (e.g., software, code, etc.). The module 132 may be implemented as code configured to be executed by a processor circuit. In one example, the module 132 may be implemented as hardware, software, or a combination of hardware and/or software.

In one example, the circuit 104 may be implemented as a Redundant Array of Independent Disks (RAID) controller. However, other controllers may be implemented to meet the design criteria of a particular implementation. The circuit 124 may be implemented as an interface. In one example, the circuit 124 may be implemented as a Peripheral Component Interconnect (PCI) interface slot. In another example, the circuit 124 may be implemented as a PCI bus that may be implemented internally on the controller 104. The circuit 126 may be implemented as a controller drive interface (or a host bus adapter). In one example, the circuit 126 may be a drive controller interface and/or host bus adapter configured to operate using a protocol such as an SAS protocol. However, the particular type and/or number of protocols may be varied to meet the design criteria of a particular implementation. In one example, an internet Small Computer System Interface (iSCSI) protocol may be implemented.

The circuit 126 may include a block (or module) 128. The block 128 may be implemented as an interface circuit (or port). In one example, the interface 128 may be implemented as an interface configured to support a SAS protocol. While an SAS protocol has been described, other protocols may be implemented to meet the design criteria of a particular implementation.

Figure 2:
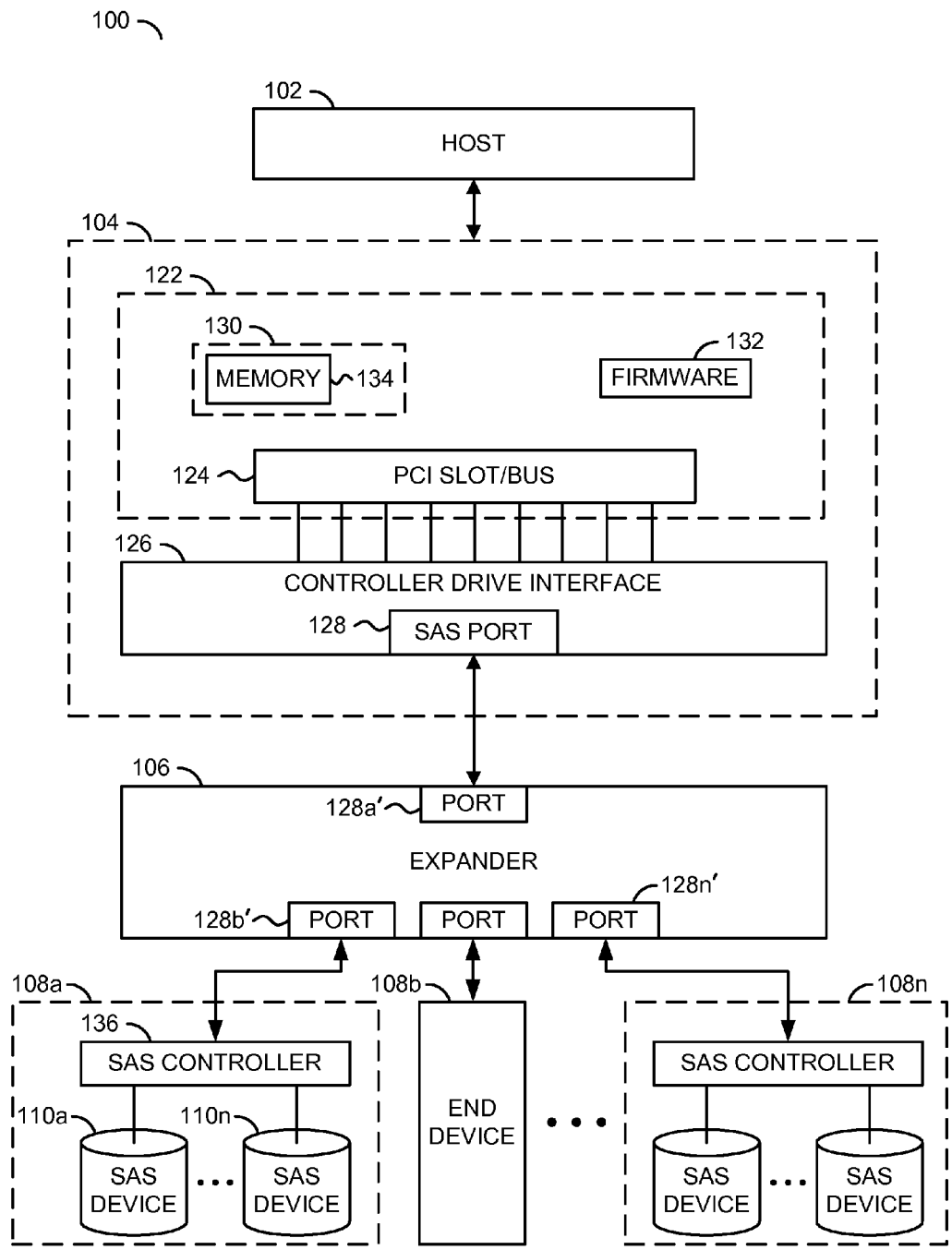
FIG. 2 is a more detailed diagram of the present invention.

Referring to FIG. 2, a diagram illustrating additional details of the system 100 is shown. The DMA engine 130 may comprise a block (or circuit) 134. The circuit 134 may be implemented as a memory storage portion. In one example, the circuit 134 may be implemented as cache memory. The circuit 134 may be implemented as a Static Random-Access Memory (SRAM), or other appropriate cache memory. The memory 134 may be implemented as either a dedicated memory within the DMA engine 130, or as a portion of a shared and/or dedicated system memory. Each of the drive arrays 108a-108n may include a block (or circuit) 136. The circuit 136 may be a controller circuit configured to control access (e.g., I/O requests) to the drives 110a-110n. In one example, the drives 110a-110n may be implemented as SAS devices. The SAS port 128 is shown, as an example, connected to a number of the SAS devices 110a-110n. One or more of the SAS devices 110a-110n may be connected directly to the SAS controller port 128. In one example, the SAS expander 106 may connect a plurality of the SAS drives 110a-110n to the port 128.

The system 100 may be implemented in a multicasting environment where each Scatter Gather List (SGL) definition has a different definition. The length of other SGLs may be derived based on the length of a currently known SGL. Context space (e.g., memory specifications for each device) may be reduced to store all the individual SGL lengths. Otherwise, memory usage and/or specifications may become significantly greater as the number of devices increase in the system 100.

The system 100 may be implemented to reduce additional memory needed in a multicasting environment. The overall memory used generally becomes more significant as the number of devices 110a-110n in a particular topology increases. Memory usage may be the same regardless of the particular definitions of the SGLs. Implementation of the system 100 may be a seamless process. In one example, the system 100 may be implemented without modification to the firmware 132 of the controller 104. In another example, the system 100 may be implemented as a sub-routine within the firmware 132.

In one example, the system 100 may implement "N" number of SGLs, where N is an integer greater than or equal to one. In one example, the system 100 may implement four SGLs. In another example, the system 100 may implement six SGLs. The particular number of SGLs implemented may be varied to meet the design criteria of a particular implementation.

The definitions of SGLs may include modes such as DMA, DMA data only, interleaved, Data Integrity Field (DIF) only, etc. The definitions may be used to derive the fields (e.g., the data length fields) of other SGLs from another SGL definition. The host 102 may generate a data stream comprising the definitions. The fields of other SGLs may be stored in the memory 134. The data length field may be implemented in a message structure. The message structure may correspond to the SGL. Data length and/or other length parameters for other SGLs may be calculated from the currently known SGL.

The controller 104 may detect whether the data stream needs to have inline DIF or if the data stream needs to have separate DIF. The controller 104 may calculate the number of blocks needed to be transferred as part of the data transfer. In one example, the number of blocks may be determined based on the following pseudocode:

if (NO DIF OR SEPARATE DIF)
   NumberOfBlocks=DataLength for SGL0/EedpBlockSize;
else//(INLINE DIF)
   NumberOfBlocks=DataLength for SGL0/(EedpBlockSize+8);

Once the number of blocks (e.g., NumberOfBlocks) have been calculated, then the length for other SGLs (e.g., "DataLengthSgln") may be calculated for various SGL definitions (e.g., an interleaved mode, a DIF only, a DMA data only, etc.).

If the SGL definition is an interleaved mode, then pseudocode may be implemented as follows:

if (INLINE DIF) then DataLengthSgln=DataLengthSgl0;
else//(SEPARATE DIF) then DataLengthSgln=(DataLengthSgl0+(NumberOfBlocks*8));

If the SGL definition is DIF only, then pseudocode may be implemented as follows:

DataLengthSgln=(NumberOfBlocks*8);

If the SGL definition is DMA data only, then pseudocode may be implemented as follows:

if (INLINE DIF) then DataLengthSgln=(DataLengthSgl0−(NumberOfBlocks*8));
else//(NON DIF OR SEPARATE DIF) DataLengthSgln=DataLengthSgl0;

Similar logic may be implemented to determine a cumulative count, other counts, and/or other parameters with minimum and/or no changes to the pseudocode described above. The pseudocode described above may be broadly used across other types of calculations. For example, the pseudocode described above may be implemented in the DMA engine 130. However, the pseudocode may be implemented in a different location and/or device based on the design criteria of a particular implementation.

Figure 3:
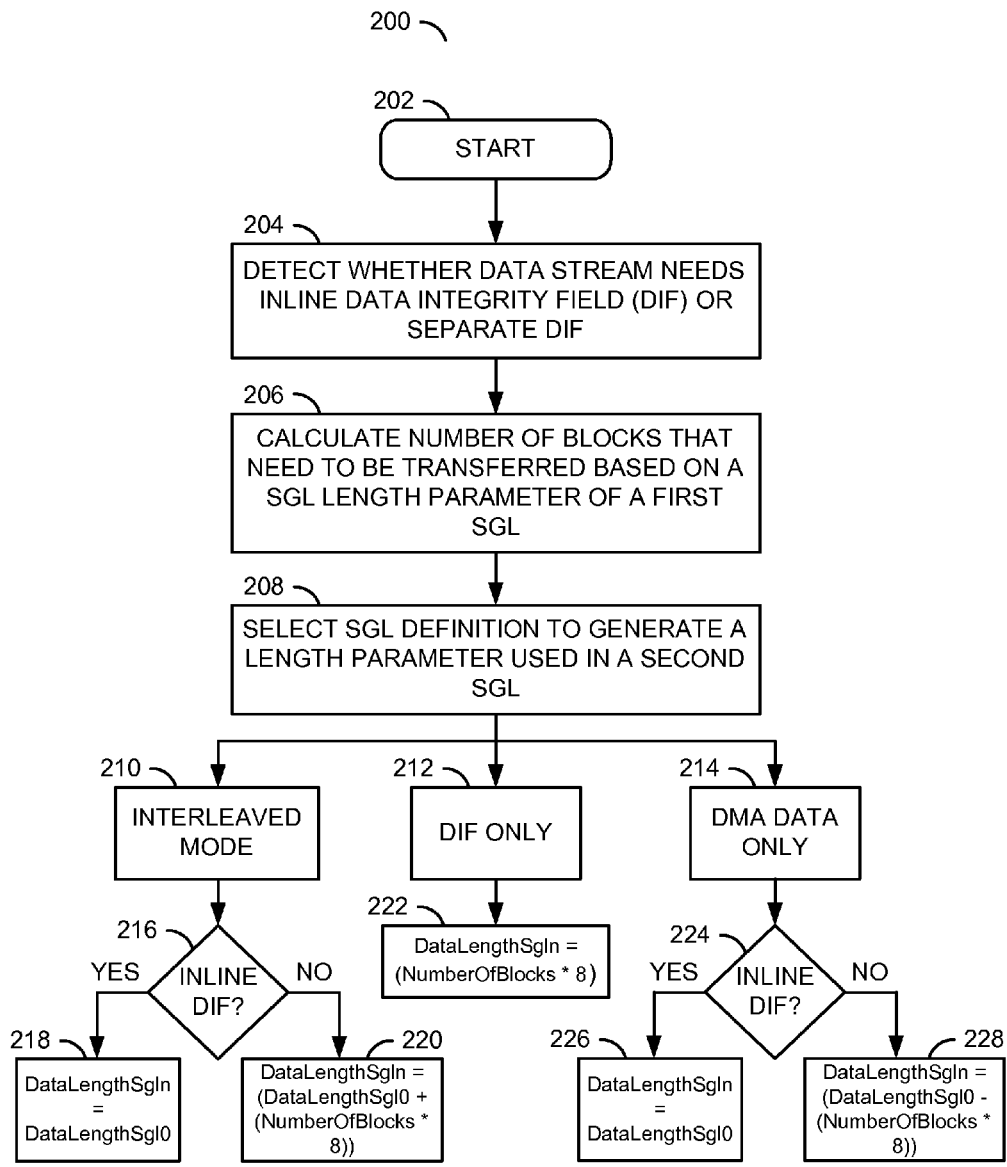
FIG. 3 is a flow diagram illustrating a process for implementing the present invention.

Referring to FIG. 3, a flow diagram illustrating a process 200 for implementing the present invention is shown. The process 200 may be implemented for a particular SGL definition (e.g., interleaved mode, DIF only, DMA data only, etc.). The process 200 generally comprises a step (or state) 202, a step (or state) 204, a step (or state) 206, a step (or state) 208, a step (or state) 210, a step (or state) 212, a step (or state) 214, a decision step (or state) 216, a step (or state) 218, a step (or state) 220, a step (or state) 222, a decision step (or state) 224, a step (or state) 226 and a step (or state) 228. The state 202 may be a start state. The state 204 may detect whether a data stream (e.g., from the host 102) needs an inline data integrity field (DIF) or a separate DIF. The state 206 may calculate the number of blocks (e.g., NumberOfBlocks) that need to be transferred based on a SGL length parameter (e.g., DataLengthSgl0) of a first SGL. The state 208 may select a particular SGL definition to generate a length parameter (e.g., DataLengthSgln) used in a second SGL.

The state 210 may represent an interleaved mode SGL definition. The state 212 may represent a DIF only SGL definition. The state 214 may represent a DMA data only SGL definition. If in the state 210, the process 200 may proceed to the state 216. Based on the results from the state 204, the state 216 may determine if the data stream needs inline DIF. If yes, the state 218 may generate a data length parameter equal to the data length of the currently know SGL (e.g., the first SGL). If no, the state 220 may generate a data length parameter equal to the data length of the currently known SGL plus eight times the number of blocks. However, other values may be added and/or multiplied to meet the design criteria of a particular implementation.

If in the state 212, the process 200 may proceed to the state 222. The state 222 may generate a data length parameter equal to the data length of the currently known SGL plus eight times the number of blocks. If in the state 214, the process 200 may proceed to the state 224. Based on the results from the state 204, the state 224 may determine if the data stream needs inline DIF. If yes, the state 226 may generate a data length parameter equal to the data length of the currently know SGL. If no, the state 228 may generate a data length parameter equal to the data length of the currently known SGL minus eight times the number of blocks. However, other values may be subtracted and/or multiplied to meet the design criteria of a particular implementation.

The functions performed by the diagrams of FIG. 3 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:

1. A method of generating length parameters, comprising the steps of:
    reading a data stream from a host, wherein said data stream comprises a plurality of list definitions including one of a plurality of modes;
    detecting whether said data stream needs an inline data integrity field (DIF) or a separate data integrity field;
    calculating a number of blocks to be transferred based on a first length parameter of a first scattered gather list; and
    selecting one of said plurality of list definitions to generate a second length parameter used in a second scattered gather list in response to (i) said field determined to be needed for said data stream and (ii) said calculated number of blocks.

2. The method according to claim 1, wherein a first of said plurality of list definitions comprises an interleaved mode.

3. The method according to claim 2, wherein said method further comprises:
    determining if said first of said plurality of list definitions needs the inline data integrity field.

4. The method according to claim 3, wherein said method further comprises:
    if said first of said plurality of list definitions needs the inline data integrity field, setting said second length parameter used in said second scattered gather list equal to said first length parameter of said first scattered gather list.

5. The method according to claim 3, wherein said method further comprises:
    if said first of said plurality of list definitions does not need the inline data integrity field, setting said second length parameter used in said second scattered gather list equal to said first length parameter of said first scattered gather list plus said calculated number of blocks.

6. The method according to claim 1, wherein a second of said plurality of list definitions comprises a Data Integrity Field (DIF) only mode.

7. The method according to claim 6, wherein said method further comprises:
    setting said second length parameter used in said second scattered gather list equal to said calculated number of blocks.

8. The method according to claim 1, wherein a third of said plurality of list definitions comprises a Direct Memory Access (DMA) data only mode.

9. The method according to claim 8, wherein said method further comprises:
    determining if said data stream comprising the third of said plurality of list definitions needs the inline data integrity field.

10. The method according to claim 9, wherein said method further comprises:
    if said data stream comprising the third of said plurality of list definitions needs the inline data integrity field, setting said second length parameter used in said second scattered gather list equal to said first length parameter of said first scattered gather list.

11. The method according to claim 9, wherein said method further comprises:
    if said data stream comprising the third of said plurality of list definitions does not need the inline data integrity field, setting said second length parameter used in said second scattered gather list equal to said first length parameter of said scattered gather list length minus said calculated number of blocks.

12. An apparatus comprising:
a host configured to generate a data stream, wherein said data stream comprises a plurality of list definitions including one of a plurality of modes; and
a controller configured to (i) detect whether said data stream needs an inline data integrity field (DIF) or a separate data integrity field, (ii) calculate a number of blocks to be transferred based on a first length parameter of a first scattered gather list, and (iii) select one of said plurality of list definitions to generate a second length parameter used in a second scattered gather list in response to (a) said field determined to be needed for said data stream and (b) said calculated number of blocks.

13. The apparatus according to claim 12, wherein a DMA engine generates said second length parameter used in said second scattered gather list.

14. The apparatus according to claim 13, wherein said DMA engine comprises a cache memory to store said first length parameter of said first scattered gather list.

15. The apparatus according to claim 12, wherein a first of said plurality of list definitions comprises an interleaved mode.

16. The apparatus according to claim 15, wherein said apparatus determines if said first of said plurality of list definitions needs the inline data integrity field.

17. The apparatus according to claim 16, wherein said apparatus is further configured to set said second length parameter used in said second scattered gather list equal to said first length parameter of said first scattered gather list if said apparatus determines said first of said plurality of list definitions needs the inline data integrity field.

18. The apparatus according to claim 16, wherein said apparatus is further configured to set said second length parameter used in said second scattered gather list equal to said first length parameter of said first scattered gather list plus said calculated number of blocks if said apparatus determines said first of said plurality of list definitions does not need the inline data integrity field.

19. The apparatus according to claim 12, wherein a second of said plurality of list definitions comprises a Data Integrity Field (DIF) only mode.

20. The apparatus according to claim 19, wherein said apparatus sets said second length parameter used in said second scattered gather list equal to said calculated number of blocks.

* * * * *